May 4, 1926.
Re. 16,342
H. A. MYERS
BRAKE MECHANISM
Original Filed Dec. 8, 1914 2 Sheets-Sheet 1
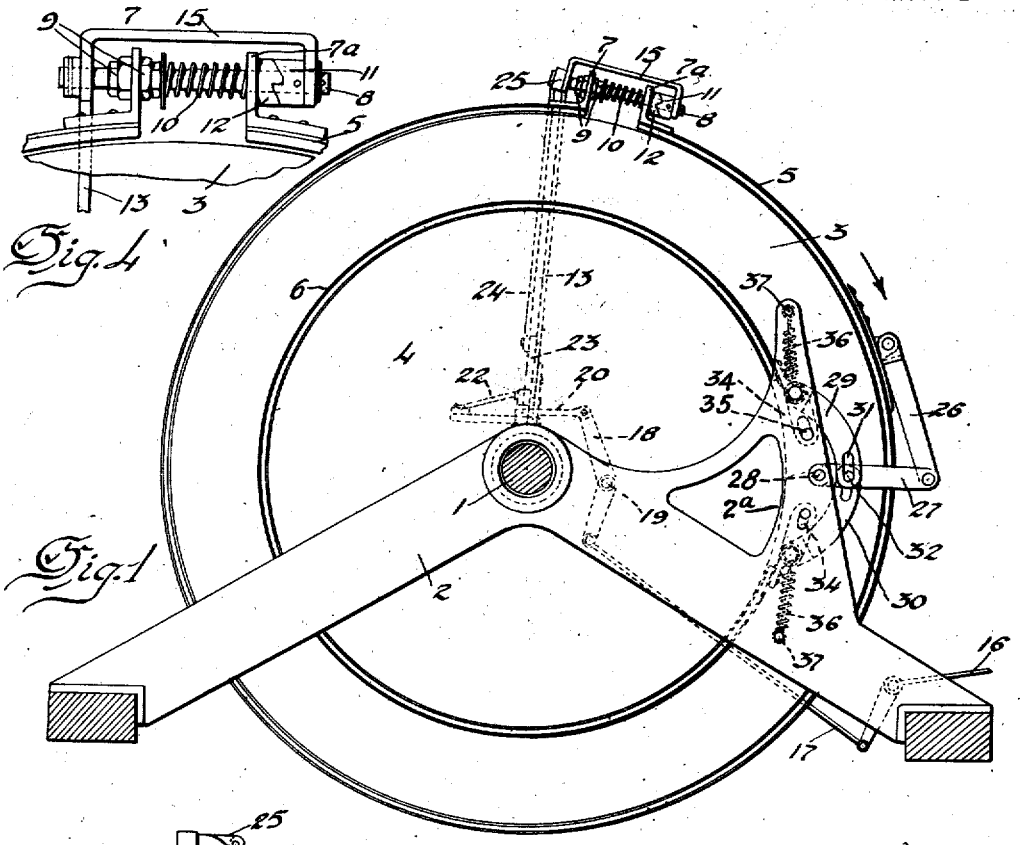
Fig. 4
Fig. 1
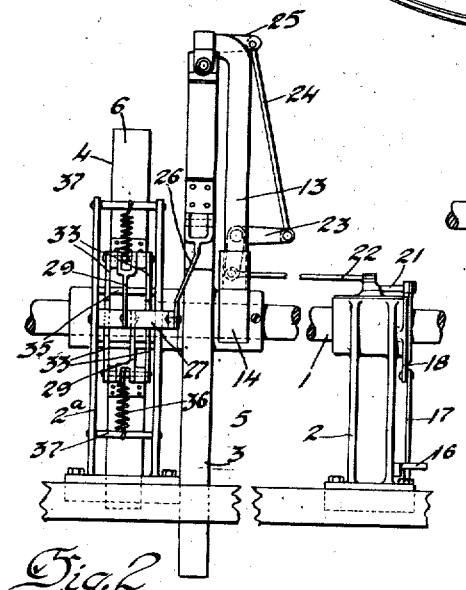
Fig. 2
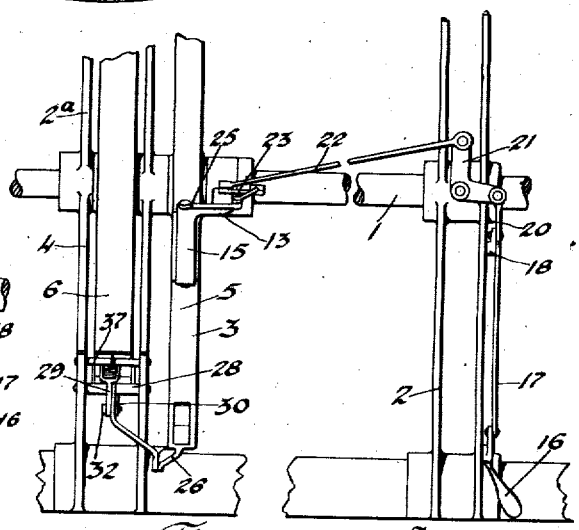
Fig. 3
Inventor
Hubert A. Myers.

May 4, 1926.

Re. 16,342

H. A. MYERS

BRAKE MECHANISM

Original Filed Dec. 8, 1914 2 Sheets-Sheet 2

Inventor

Hubert A. Myers.

Reissued May 4, 1926. Re. 16,342

UNITED STATES PATENT OFFICE.

HUBERT A. MYERS, OF TOLEDO, OHIO, ASSIGNOR, BY DIRECT AND MESNE ASSIGNMENTS, TO FRANK E. LIVERANCE, JR., OF GRAND RAPIDS, MICHIGAN.

BRAKE MECHANISM.

Original No. 1,182,402, dated May 9, 1916, Serial No. 876,033, filed December 8, 1914. Application for reissue filed June 4, 1923. Serial No. 643,446.

*To all whom it may concern:*

Be it known that I, HUBERT A. MYERS, a citizen of the United States, and a resident of Toledo, in the county of Lucas and State of Ohio, have invented a certain new and useful Brake Mechanism; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to means for imparting a braking action to rotating elements.

The primary object of my invention is the provision of a simple and efficient manually controlled braking mechanism for a rotating part, which mechanism is automatically operable in part by the movement of said rotating part to impart a braking action thereto.

A further object of my invention is the provision of a mechanism of the character described, which is rendered operable by a slight and easy movement of a control part to impart a powerful and efficient braking action to a rotating part.

In one form the invention comprises braking mechanism for an automobile or other vehicle, in which a brake given an angular movement by the momentum of the moving vehicle is utilized to apply another brake or brakes, preferably on the road wheels.

Further objects and advantages of the invention will be apparent from the following detailed description thereof.

The invention is fully described in the following specification, and while it is capable of use in numerous connections and of embodiment in numerous forms, two embodiments only thereof are illustrated in the accompanying drawings, in which:

Figure 1 is a side elevation of a mechanism embodying the invention;

Figure 2 is a different reduced elevation thereof with parts broken away;

Figure 3 is a top plan view thereof with parts broken away;

Figure 4 is an enlarged detail of a portion of the mechanism: and

Figure 5:
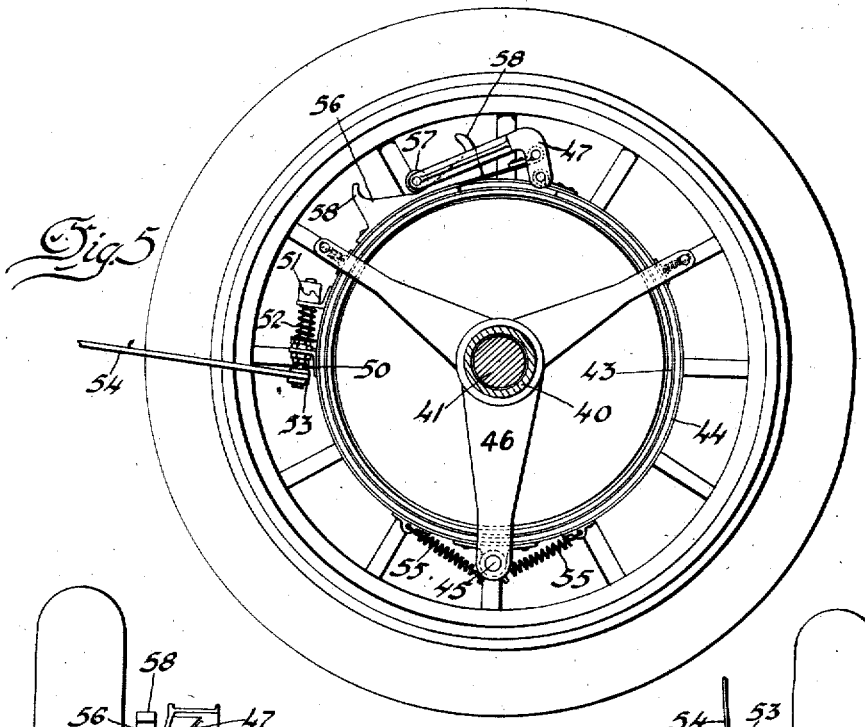
Figures 5, 6 and 7 are inner side, front and top plan views respectively of another form of my brake mechanism in connection with an automobile wheel.

Referring to the drawings, 1 designates a shaft, which is journaled in a frame part 2, and carries, in the present instance, a pair of wheels, drums or other rotating parts 3 and 4, which are fixedly connected through the shaft, or in any other suitable manner whereby in effect they are the same as a single member or part.

It will be understood that the rotary parts 3 and 4 may assume numerous forms and relative arrangements, and that their present embodiment and relative positioning is merely illustrative of the broad idea of the invention.

The rotary parts 3 and 4 are peripherally engaged by bands 5 and 6, respectively, of the split type. The band 5 has its ends terminating in adjacent spaced relation and provided with outwardly projecting ears 7, $7^a$, which are apertured for the projection therethrough of a shaft 8. This shaft projects at its ends beyond the respective ears 7, and, while permitted to have rotary movements relative to both ears, it is prevented from longitudinal movements relative to the ear 7 by nuts 9, in the present instance, which nuts are threaded to the shaft at opposite sides of the ear. A coiled compression spring 10 is mounted on the shaft 8 between the two band ears and acts to urge a separation of said ears whereby to normally maintain the band in loose relation to the part 3 on which it is mounted.

The end of the shaft 8, which is disposed without the ear $7^a$, in the present instance, fixedly carries a cam member 11, which, upon a rotation of the shaft 8 from normal position, coacts with a stationary cam 12, which is fixedly attached to the ear $7^a$, and effects a drawing together of the band ends against the tension of the spring 10 and a consequent tightening of said band on the part 3. An arm 13 projects radially from the shaft 1 and has its inner end provided with a collar 14, which loosely encircles said shaft and has its outer end provided with a yoke 15, which is disposed without the periphery of the part 3 and has its arms provided with bearing openings in which the outer end portions of the cam shaft 8 are respectively journaled. It is thus evident that the shaft 8 and brake band 5 are supported from the shaft 1 independently of the part 3. It will be understood that the shaft 1 may be considered as any convenient part adapted for the supporting of the arm 13.

The shaft 8 has connection, through suitable connecting means, with a control part, which may be located at any convenient point of access. The control part, in the present instance, comprises a bell-crank form of lever 16, which is pivoted to any suitable part, as, for instance, a portion of the frame 2 at one side of the rotary part 3, and has one arm connected by a rod 17 to one arm of a lever 18 that is also shown, in the present instance, as being pivoted to the frame 2, as at 19. The other arm of the lever 18 is connected by a link or rod 20 to one arm of a bell-crank lever 21, which is likewise pivoted to the frame 2 near the shaft 1 and has its other arm connected by a rod or link 22 to one arm of a bell-crank lever 23, which, in the present instance, is pivotally carried by the arm 13 for radial rocking movements relative to the rotary part 3. A rod or link 24 connects an arm of the lever 23 to a crank-arm 25 projecting from an end of the cam shaft 8. The connection between the control lever 16 and shaft 8 is such, in the present instance, that the application of force to the free arm of the lever 16 will impart rotation to the shaft 8 in a direction to effect a contracting of the brake band 5 by reason of the cooperative action of the cam members 11 and 12. The coaction of the cams 11 and 12 is preferably such that an initial portion of a band contracting rotation of the shaft 8 will quickly contract the band substantially to element-gripping position and will then, upon a continued rotation of the shaft in the same direction, effect a more gradual and consequently more powerful frictional engagement of the band with its rotary part. This may be accomplished by making the initial portion of the cam of one of the cam members 11—12 more abrupt than the concluding end portion thereof, as is shown in Figure 4. It will be understood that the band 5 when clamped to its part 3 will have a tendency to rotate therewith.

An arm 26 is pivotally attached at one end to the outer side of the band 5 adjacent to the point of separation of the ends of the brake band 6 and extends in substantially tangential relation to the band 5. The arm 26 has pivotal connection at its free end with one end of a link 27, which link extends inward from said arm toward the shaft 1 and has its other end provided, in the present instance, with oppositely projecting trunnoins 28, which are journaled at their outer ends in portions $2^a$ of the frame 2, which frame portions are disposed at opposite sides of the rotary part 4 adjacent to the periphery thereof. The point of connection of the trunnions 28 with the frame portions $2^a$ is disposed intermediate the ends of the brake-band 6.

Projecting toward each other from the opposite ends of the brake-band 6, to which ends they are respectively pivoted, are two links 29 and 30, each of which is provided at its outer or free end, with relation to the band, with a longitudinally extending slot 31 into which the respective ends of a pin 32, that is carried by the link 27, without its trunnioned end, project. When the brake-band 6 is in its normal or released position with respect to the rotary part 4 the pin 32 stands at the outer end of each slot 31. It is thus evident that upon a rotary movement of the band 5 in the direction indicated by the arrow at the right of Figure 1 the rocking movement, which is thereby imparted to the link 27, will cause the pin 32 to act against the outer end wall of the slot 31 and apply a pulling or tightening stress to the end of the brake band 6 to which the link 29 is connected. Accordingly upon a movement of the band 5 in the opposite direction, should it be impelled in such direction by the rotation of the part 3, when engaged therewith, will apply a pulling stress to the other end of the brake-band 6, or the end thereof to which the link 30 is attached. Each end of the brake-band 6 has a pair of links 33 pivotally projecting therefrom toward the pair at the other end of the band, and these links are provided with longitudinally extending slots 34 in their outer ends, which receive pins 35, which rigidly connect the frame parts $2^a$ without the periphery of the rotary part 4. A coiled contractile spring 36 connects each end of the brake-band 6 to respective pins or anchoring parts 37 projecting from convenient portions of the frame parts $2^a$, and these parts urge the ends of the band 6 to stand at the limit of their outward movements relative to the respective pins 35, as shown in Figure 1. When a contracting stress is applied to either end of the band 6 such end has a movement relative to its anchoring pin 35 against the tension of the adjacent spring 36, while the opposite end of the band is held stationary due to the coaction of its pin 35 with the outer end walls of the slots 34 in the respective links 33.

It is evident that the application of very little pressure on the control lever 16 will suffice to actuate the connected cam mechanism to move the band 5 into gripping engagement with the rotary part 3, and that the rotative force which is then exerted on the band 5 by the rotary part will be communicated to the brake-band 6 and effect a firm clamping thereof to its rotary part 4, the braking force which is applied to the band 6 being very considerably greater than the gripping force that is applied to the band 5. It is thus apparent that when the control means has been initially moved to throw the parts into operative relation the momentum of the rotating means or member will then act in conjunction with the braking mechanism to automatically impart a powerful braking action to said means or member to stop or retard the rotation thereof. The force applied to the part 4 of said means or member depends on the force applied to the control member 16, as the more tightly the band 5 is clamped to its part 3 the less will be the tendency of one to slip with relation to the other.

Figure 6:
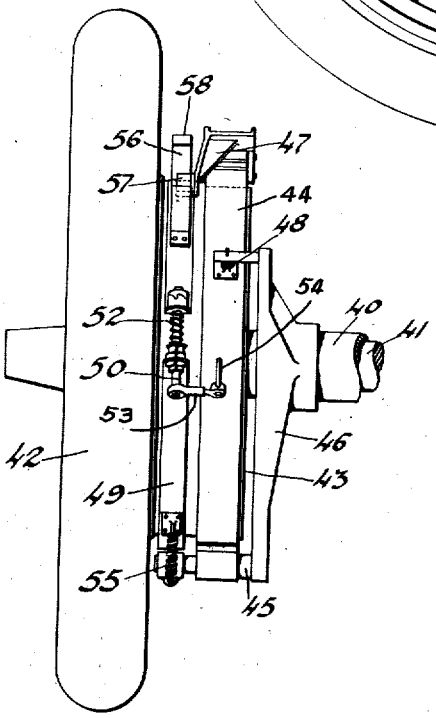
Figure 7:
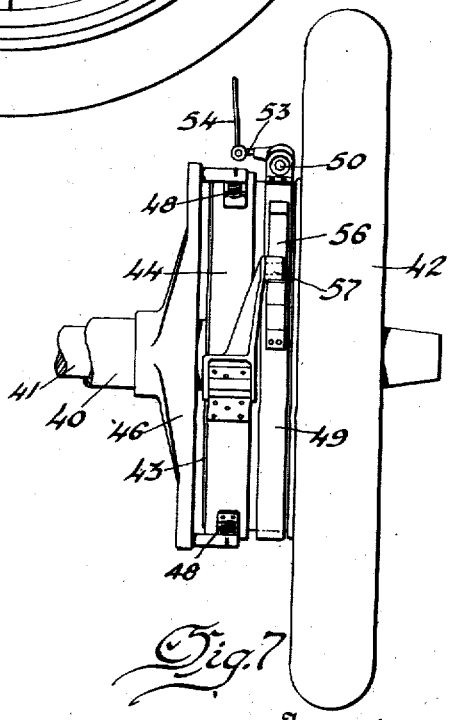

The construction of the brake mechanism illustrated in Figures 5, 6 and 7 differs mainly from the construction hereinbefore described in the manner of communicating a clamping action to the brake-band from a relative rotary movement of the control-band.

In Figures 5, 6 and 7, 40 designates the rear tubular axle of an automobile, 41 the drive shaft extending through said axle, and 42 a wheel carried by the shaft. The wheel is provided on its inner side with the customary brake drum 43, with which the usual brake-band 44 coacts. This band is pivotally carried, in the present instance, by a pivot-stud 45, which projects from the outer end portion of one arm of a spider 46, which is carried by the axle 40. The ends of the band 44 are connected in spaced relation to one arm of an L-form of lever 47 in the customary manner. Springs 48 which project from respective arms of the spider 46 have connection with the brake-band 44 near its ends and cooperate with the stud 45 to normally retain the band in spaced relation to the drum. The control-band 49 for the brake-band 44 is mounted on the drum 43 at one side of the brake-band. The ends of the band 49 are connected and its contracting movements controlled in the same manner as described for the other form of the mechanism, 50 being the cam-shaft connecting the band ends, 51 the coacting cams thereon, 52 the spacing-spring, 53 the crank arm on the cam-shaft, and 54 the rod which connects the crank-arm to the control means, which means may be located at any convenient point in the automobile. Coiled contractile springs 55 project in opposite directions from the stud 45 and connect with the band 49. These springs hold the band 49 normally in one position relative to the brake-band 44. The band 49 is provided adjacent to the lever 47 with opposed inclines 56 with which a roller 57 which is carried at the outer end of the long arm of the lever 47 engages. When the band 49 is in normal position the roller 57 stands in neutral position between the inclines whereby a turning of the band 49 in either direction relative to the band 44 will move one or the other incline into engagement with the roller and impart a consequent brake-band contracting movement to the brake-band 44. Each incline is provided at its outer end with a hook or shoulder 58 to prevent the roller 57 passing over the outer end of either incline. It is evident that a drawing of the band 49 to the brake-drum when rotating will cause a partial movement of the band with the drum and move one incline under the roller 57 to effect a rocking of the lever 47 and a consequent application of the brake-band 44 to the brake-drum. Upon a release of the band 49 from engagement with the brake-drum the active spring 55 will return the band to normal neutral position.

I wish it understood that my invention is not limited to any specific construction, arrangement or form of the parts as numerous modifications may be made without departing from the spirit of the invention.

Having thus described my invention, what I claim as new, and desire to secure by Letters Patent, is:

1. In combination, a rotatable member, a pair of friction bands operable to engage and release said member, a connection between said bands operable to cause one to grip said member when the other is in engagement with the member and moved thereby a device for causing the said other band to engage said member to cause such gripping by the first band, a manually operable lever supported separately from said bands, and means for linking said lever and said device to provide manual control of said other band and automatic control of the first band by said other band.

2. In combination, a rotatable member, a pair of bands operable to frictionally engage said member, one band being anchored against rotation with the member, and the other band being capable of limited rotary movement therewith, an angularly movable cam member for applying the rotary band to the member, manually operated means to actuate the cam member, mechanical connections between the bands operable, when the cam member is actuated, to apply the anchored band.

3. In combination, a rotatable member, a pair of friction elements relatively movable into and out of frictional engagement with said member and one of said elements being capable of rotary movements with said member, means operable by a rotary movement of one of said elements to impart a member engaging movement to the other of said elements, and means operable to quickly move the rotatable element into member engaging position and then to apply a slower and more powerful member-gripping movement thereto.

4. In combination, a frame, a pair of drums rotatable relative to said frame, a brake positioned in cooperative relation to one of said drums and arranged for limited to and fro movements in respect to said frame, manually operated means for applying said brake, a second brake operable upon the second drum, connecting means between said brakes, structurally independent of and unrelated to said manually operating means, whereby the second brake is operated by the first in either direction of movement of said drums.

5. In combination, a frame, two brake drums rotatably mounted with respect to the frame, an expansible and contractable brake device operable frictionally to engage each drum, one of which has a limited angular movement with its drum, a connection from the angularly-movable device operated by movement thereof to expand and contract the device on the other drum to control its braking action, and manually-operated links and levers supported by the frame and arranged to operate the angularly-movable brake device.

6. In combination, a frame, a pair of brake drums rotatably mounted thereon, a brake device for each drum which is expansible and contractable in the plane of the drum, and one of which has a limited angular movement when in frictional engagement with its drum, a connection operated by such angular movement frictionally to apply the other device to its drum, a manually-operable lever supported on the frame, and means operated by the lever and operating the angularly-movable brake device.

7. In combination, a rotatable member, main and auxiliary brake bands encircling different parts of said member and each operable to apply a braking action to the member, said main band having limited rotary movements with said member in either direction of rotation thereof when clamped thereto, means connecting said main band to the end portions of said auxiliary band and operable by a movement of the main band in either direction with said member to impart a contractile action to the auxiliary band, and manually-controlled mechanism supported in part separately from said bands and substantially unaffected by said limited rotary movements and arranged to operate the main band.

8. In combination, a frame, a member rotatable relative to said frame, main and auxiliary brake bands encircling parts of said member, the main band having limited rotation from normal position with said member when clamped thereto and the member is rotated in either direction and said auxiliary band having both of its ends anchored to said frame each for movements toward and away from the other end, means connecting said main band to both ends of said auxiliary band and having a part connected to said frame, said means being operable to impart contracting movements to one or the other end of said auxiliary brake band depending on the direction of rotation of said member when the main band is contracted thereon.

9. In combination, a frame, a member rotatable relative to said frame, a main brake band encircling said member and operable to clamp the same and to have limited rotary movements therewith in either direction of rotation of the member, an auxiliary brake band encircling a part of said member and having each end anchored to said frame for limited longitudinal movements relative thereto, springs connecting said frame and the end portions of said auxiliary band to normally retain said ends at the limit of their outward movement relative to the frame, means projecting from said main band and having separate connection with each end of said auxiliary band and operable upon a movement of the main band in one direction with the member to impart a contractile movement to one end of the auxiliary band and upon a movement of the main band in the opposite direction with said member to apply a contractile movement to the other end of the auxiliary band.

10. A brake comprising, in combination, two brake drums of cylindrical form, an expansible and contractable brake device cooperating with each drum, an operating lever supported separately from the devices, a mechanical linkage operated by the lever to operate one of the devices to move it radially against its drum and cause it to move a short distance circumferentially with its drum, and a mechanical linkage operated by circumferential movement of said device to move the other brake device radially against its drum.

11. A brake comprising, in combination, two cylindrical brake drums, a main and an auxiliary brake device, each device being radially expansible and contractable, and the two brake devices being engageable respectively with the two drums, a cam for operating the main brake device, the main brake device being movable circumferentially with its drum when operated by the cam, and a mechanical linkage operated by circumferential movement of the main brake device to operate the auxiliary brake device.

12. A brake comprising, in combination, a pair of cylindrical brake drums, main and auxiliary retarding devices movable respectively into frictional engagement with the two drums, a manually-operable lever, connections from the lever for applying the main retarding device to its drum, a lever rocked by the main retarding device when in frictional engagement with its drum, and a pair of oppositely-arrangd devices having lost-motion engagement with the lever to apply the second retarding device to its drum, one of the oppositely-arranged devices being effective in one direction of movement of the main retarding device and the other being effective in the other direction of movement.

13. A brake comprising, in combination, a cylindrical brake drum, a retarding device expansible and contractable in the plane of the drum and cooperating therewith, manually-operable connections for applying the retarding device to the drum, said connections including parts arranged to swivel about an axis adjacent the axis of the drum in such a manner that they are substantially unaffected by angular movement of the retarding device, and an auxiliary retarding device and drum brought into frictional engagement with each other by angular movement of the expansible and contractable retarding device.

14. A brake comprising, in combination, a rotary member, an expansible and contractable retarding device cooperating therewith, manually-operable connections for applying the retarding device to the rotary member and engaging the retarding device at a point removed from the axis of rotation, said connections including parts arranged to swivel about an axis adjacent the axis of said member in such a manner that they are substantially unaffected by angular movement of the retarding device, and an auxiliary retarding device brought into frictional engagement with said rotary member by angular movement of the expansible and contractable retarding device.

15. A brake comprising, in combination, two coaxial brake drums, corresponding main and auxiliary expansible and contractable retarding devices engagable with the respective drums at a point removed from the axis of rotation, connections passing adjacent the common axis of the drums for applying the main retarding device to its drum in such a manner as to be substantially unaffected by angular movement of the main device with its drum, and connections operated by angular movement of the main device for applying the auxiliary device to its drum.

16. A brake comprising, in combination, a pair of brake drums, a corresponding pair of contractable bands, each surrounding one of the drums, a manually-operable lever supported separately from said bands, connections from the lever for tightening one of the bands about its drum, a lever rocked by angular movement of the tightened band with its drum, and a pair of devices connected to opposite ends of the other band and having lost-motion connection with the second lever to tighten the said other band about the other drum whichever direction the said tightened band may move.

17. A brake comprising, in combination, a rotary device, a pair of brake members capable of frictionally engaging said device, and one of which has a limited angular movement when in frictional engagement therewith, manually-controlled connections passing adjacent the axis of rotation of said device for applying the angularly-movable brake member to said device and which swing with the angularly-movable brake member without being substantially affected by its angular movement, and connections operated by angular movement of said brake member in either direction for applying the other brake member to said device.

18. A brake comprising, in combination, a rotary device, two retarding devices movable into frictional engagement therewith, one of which has a limited angular movement with said rotary device and is arranged to operate the other retarding device by its angular movement in either direction, a manually-operable lever supported separately from the retarding devices, and connections from the lever for operating the angularly-movable retarding devices which include a member pivoted adjacent the axis of rotation of the rotary device and extending in a substantially radial direction so that operation of the connections is substantially unaffected by said angular movement of the first retarding device.

19. A brake comprising, in combination, a rotary device, main and auxiliary retarding devices arranged frictionally to engage the rotary device, the main retarding device having a limited angular movement with the rotary device and arranged to operate the auxiliary retarding device by its angular movement, a cam for moving the main retarding device against the rotary device, a manually-operable lever, and connections from the lever for rocking the cam, the cam and said connections being constructed and arranged to permit angular movement of the main retarding device without substantially affecting the action of the cam.

20. Manually-controlled power mechanism for applying a brake comprising, in combination, a rotary drum, a retarding device expansible and contractable in the plane of the drum and frictionally engageable with the drum, a manually-operable lever supported separately from the retarding device, connections from the lever which operate the retarding device and which are substantially unaffected by angular movement of the retarding device, and a brake-operating lever rocked by angular movement of the retarding device when in frictional engagement with the drum.

21. Manually-controlled power mechanism for applying a brake comprising, in combination, a rotary drum, a support swiveled for angular movement about the axis of the drum, an expansible and contractable retarding device carried by the support and movable in the plane of the drum into frictional engagement with the drum, a manually-operable lever spaced from the drum and the swiveled support, connections from the lever for applying the retarding device to the drum, which connections are substantially unaffected by angular movement of the support, and brake-applying connections operated by angular movement of the retarding device and its support.

22. Manually-controlled power mechanism for applying a brake comprising, in combination, a rotary drum, a support swiveled for angular movement about the axis of the drum, an expansible and contractable retarding device carried by the support, a cam journaled in the support and oscillatable to move the retarding device into frictional engagement with the drum, a manually-operable lever spaced from the drum, connections from the lever for rocking the cam, and brake-applying connections operated by angular movement of the retarding device and its support.

23. Manually-controlled power mechanism for applying a primary brake comprising, in combination, a rotary member, a friction device manually movable into engagement therewith and capable of angular movement when so engaged, and a pair of primary brake-applying links having pin-and-slot lost motion connections arranged to be operated by angular movement of the friction device and one of which is effective when the device turns in one direction, and the other of which is effective when the device turns in the opposite direction, the idle connection having lost motion as described, in either case.

24. Manually-controlled power mechanism for applying a primary brake comprising, in combination, a rotary brake drum, a pivoted support movable adjacent the drum in a plane parallel to the plane of the drum, a brake device carried by the support and expansible and contractable in the plane of the drum for cooperation with the drum, a cam carried by the support and controlling the expansion and contraction of the brake device, primary-brake-operating connections operated by angular movement of the support and brake device, and manually-controlled means for rocking the cam.

25. Manually-controlled power mechanism for applying a primary brake comprising, in combination, a rotary brake drum, a pivoted support beside the drum, a brake band carried by the support surrounding the drum, a rock member carried by the support for contracting the band against the drum, primary-brake-operating connections operated by angular movement of the support and brake band, and manually-controlled means for rocking the rock member.

26. In combination, a rotatable member, a pair of bands operable to frictionally engage said member, one band being anchored against rotation with the member, and the other band being capable of limited rotary movement therewith, a link connection between the adjacent ends of the anchored band, a mechanical connection between the link connection and the rotary band operable by a rotary movement of the rotary band to apply the second brake through the link.

27. In combination, a frame, a pair of drums rotatable relative to said frame, a brake positioned in cooperative relation to one of the said drums, and arranged for limited to and fro movement in relation to said frame, means for applying said brake, a second brake operable on the second drum, connecting means between said brakes structurally independent of and unrelated to said means for applying the first brake, whereby the second brake is operated by the first in either direction of movement of said drums.

HUBERT A. MYERS.

Certificate of Correction.

It is hereby certified that in Reissue Letters Patent No. 16,342, granted May 4, 1926, upon the application of Hubert A. Myers, of Toledo, Ohio, for an improvement in "Brake Mechanism," an error appears in the printed specification requiring correction as follows: Page 5, lines 49 and 50, strike out the words "at a point removed from the axis of rotation" and insert the same after the word "drum," line 52, same claim; and that the said Letters Patent should be read with this correction therein that the same may conform to the record of the case in the Patent Office.

Signed and sealed this 13th day of July, A. D. 1926.

[SEAL.]

M. J. MOORE,
*Acting Commissioner of Patents.*